July 7, 1925.
H. G. TRAVER
BUMPER FOR MOTOR VEHICLES
Filed Dec. 1, 1924
1,544,613
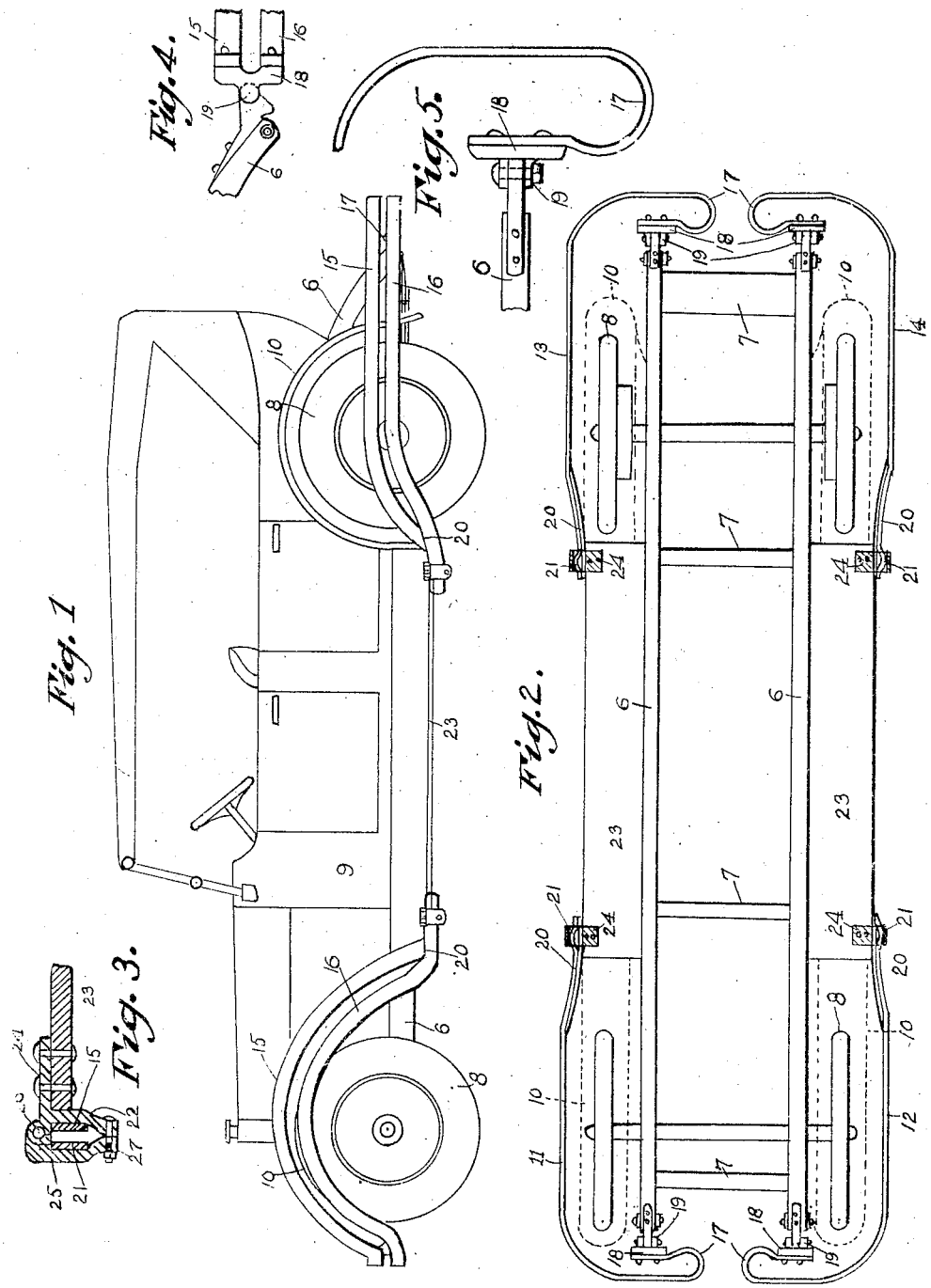
Inventor
H.G. Traver
By his Attorney John O. Seifert Patented July 7, 1925.

1,544,613

UNITED STATES PATENT OFFICE.

HARRY G. TRAVER, OF BEAVER FALLS, PENNSYLVANIA.

BUMPER FOR MOTOR VEHICLES.

Application filed December 1, 1924. Serial No. 753,100.

*To all whom it may concern:*

Be it known that I, HARRY G. TRAVER, citizen of the United States, and resident of Beaver Falls, in the county of Beaver and State of Pennsylvania, have invented certain new and useful Bumpers for Motor Vehicles, of which the following is a specification.

This invention relates to bumpers for motor vehicles to prevent damage to a vehicle by head-on and rear end collisions, and it is the object of the invention to provide an improved bumper for this purpose which is also in the nature of a shock absorber, and to provide a bumper which is simple and cheap in structure and efficient in use.

It is a further object of the invention to provide a bumper of this character adapted to serve as a side bumper or guard for the vehicle.

In the drawing accompanying and forming a part of this specification I have shown an embodiment of the invention in which Figure 1 is a side elevation of a motor vehicle with my improved bumpers and side guards applied thereto.

Figure 2 is a plan view of the chassis frame of a motor vehicle showing in dotted lines the fenders or mud guards in relation to the vehicle wheels and my improved bumpers applied thereto.

Figure 3 is a cross sectional view of a mounting for one end of the bumpers.

Figure 4 is a detail view in side elevation of the mounting for the other end of the bumpers; and Figure 5 is a plan view of the mounting for the bumper shown in Figure 4.

I have shown an embodiment of the invention in connection with a motor vehicle of conventional form comprising a chassis frame having side members 6, 6 connected by cross bars 7 and supported upon axles for traction wheels 8 provided with the usual tires. The body 9 is mounted upon the chassis frame and carries fenders or mud guards 10 to extend laterally therefrom and around the upper portion of the wheel 8.

While my improved bumper is adapted for use at the forward and rear ends of the motor vehicle to prevent damage to the fenders or mud guards for the front wheels 8 by a head-on collision as well as the radiator and lamps arranged at the front end of the vehicle, and damage to the fenders or mud guards for the rear wheels and vehicle body by a rear end collision, the bumper is also adapted to serve as a side bumper or guard to prevent damage to the wheel fenders by side swiping or otherwise.

In the use of the present bumper a series of four bumpers 11, 12, 13 and 14 are preferably employed as shown in Figure 2 to serve as front and rear bumpers having side bumpers combined therewith, although it will be obvious that they may be used either as front or rear bumpers, or a front bumper having side bumpers combined therewith or a rear bumper having side bumpers combined therewith.

In the embodiment illustrated each of the bumpers comprises bands or bars of resilient material of greater width than thickness, there being two 15, 16 shown in the present instance. Each bumper member comprises a resilient band attached at one end to a bracket 18 to extend inward toward the longitudinal axis of the vehicle and bent in a curve upon itself, as at 17, to extend outward across the fender, then bent to extend longitudinally of the vehicle at the outer side of the wheel, and the end mounted in a supporting bracket secured to the running board. The brackets 18 are pivotally supported upon a fixed part of the vehicle, upon the extremities of the side members of the chassis frame, as shown at 19. The portions of the bumper bands arranged at the front of the vehicle and extending in a direction longitudinally of the vehicle and opposite the wheels are curved upwardly to substantially follow the contour of the mud guard or fender for the front wheels not only serving as a guard for the same but also permitting of the movement of said wheels upon the vertical axis of the support therefor to permit of steering or guiding of the vehicle.

The ends of the bumper bands at the side of the vehicle are arranged so that one band adjacent the extremity will lie with the side thereof in juxtaposed relation or contiguous to the side of the other bands as shown at 20, and mounted upon a fixed part at the side of the vehicle to have simultaneous longitudinal yielding movement and longitudinal movement one relative to the other, with one band provided with a longitudinally bulged portion 21.

To mount said ends of the bumper bands there are provided brackets, each bracket comprising a member 22 mounted upon the running board 23, or a supporting bracket therefor, shown in the present instance as mounted upon the running board by a longitudinally extending arm 24, as shown in Figure 3, a second member 25 having a pivotal or hinge connection 26 with the member 22 and between which members the juxtaposed bands engage with the bulged portion 21 lying contiguous to the member 22 and are clamped in such position by a bolt 27, the pressure of the bracket or clamping member 25 upon the bulged portion 21 firmly though yieldingly holding the bands in position.

To permit of the removal of the vehicle wheels the securing member 25 for the juxtaposed ends 20 of the bands is released when said end of the bumper may be swung upward upon the pivot support 19 away from the wheel.

While I have illustrated and described the bumpers 11, 12, 13 and 14 as consisting of a pair of bands it will be obvious that a single band or bar may be utilized and come within the scope of the invention.

Having thus described my invention, I claim:

1. A bumper for vehicles, comprising a band of resilient material bent upon itself to substantially U shape with one of the legs of greater length than the other leg and bent at a right angle to extend in a direction toward the shorter leg, and said band adapted to be mounted at both ends upon a fixed part of the vehicle.

2. A bumper for vehicles, comprising a band of resilient material bent upon itself to substantially U shape with the legs extending in parallel relation, one of the legs being of greater length than the other leg and extended at a right angle to and curved laterally of the legs, and said band adapted to be mounted at both ends upon a fixed part of the vehicle.

3. In bumpers for vehicles, a band of springy material bent to angular form and mounted at one end upon a fixed part at the end of the vehicle to extend transversely of the plane of rotation and laterally of the wheel, and the other leg extending at the outside of the wheel substantially in parallel relation to the plane of rotation of the wheel and connected at the side of the vehicle to have longitudinal yielding movement.

4. In bumpers for vehicles, a band of resilient material bent to angular form and mounted by one leg on a fixed part at the end of the vehicle and to extend transversely of the plane of rotation and laterally of a wheel, and the other leg extending at the outside of the wheel substantially in parallel relation to the plane of rotation of the wheel and curved upwardly and connected at the extremity to the vehicle to have longitudinal sliding movement.

5. In bumpers for vehicles, a band of springy material bent upon itself to substantially U shape and mounted at the end of one leg on a fixed part at the end of the vehicle with the U shape portion extending in a direction toward the longitudinal axis of the vehicle, the other leg of the band being of a length to extend outward a distance beyond the wheels and connected to the vehicle.

6. In bumpers for vehicles, a bracket mounted on a fixed part at the end of the vehicle to have movement on an axis extending transversely of the vehicle, a band of resilient material bent to substantially right angle form, one angle portion of the band to extend transversely of the plane of rotation of a vehicle wheel and having the end thereof bent upon itself to substantially U shape and fixed at the extremity to the bracket, the other angle portion of the band extending longitudinally of the vehicle at the outer side of the wheel and connected adjacent the extremity thereof to a fixed part at the side of the vehicle.

7. A bumper for vehicles, comprising a pair of bands of resilient material bent to right angle form, said bands being mounted at one end to a fixed part at the end of the vehicle in parallel edgewise spaced relation to extend transversely of the plane of rotation of a wheel, and the other angle portion of the bands extending longitudinally of the vehicle and at the outer side of the wheel and arranged with the extremities in overlapped relation, and means to connect said latter extremities to a fixed part at the side of the vehicle.

8. The combination with a vehicle, of bumpers therefor to extend transversely of and in parallel relation to the direction of travel of the wheels, each of said bumpers comprising bands of resilient material bent to right angle form with one end extending transversely of a wheel and bent upon itself to substantially U shape; brackets mounted on a fixed part at the end of the vehicle to have movement on an axis transverse to the longitudinal axis of the vehicle and to which brackets the bands are fixed in edgewise spaced relation at one end, the other ends of said bands being arranged in juxtaposed sidewise relation; and means to mount the bands at the juxtaposed ends upon a fixed part at the side of the vehicle to have simultaneous longitudinal movement and longitudinal sliding movement relative to each other.

9. The combination with a vehicle, of bumpers therefor to extend transversely of and in parallel relation to the direction of travel of the wheels, each of said bumpers comprising bands of resilient material bent to right angle form with one end extending transversely of the wheels and bent upon itself to substantially U shape; brackets mounted on a fixed part at the ends of the vehicle to have movement on an axis transverse to the longitudinal axis of the vehicle and to which brackets the bands are fixed in edgewise spaced relation at one end, the other ends of said bands being arranged in juxtaposed sidewise relation with the outer band provided with a laterally bulged portion; and means to mount the bands at the juxtaposed ends at the side of the vehicle to have simultaneous longitudinal yielding movement, and longitudinal sliding movement relative to each other, comprising a bracket secured to a fixed part of the vehicle arranged to embrace the side of the band, and a member pivotally connected to the first member adapted to embrace the side of the other band and co-operate with the first member to releasably clamp the juxtaposed bands between said members.

Signed at Beaver Falls in the county of Beaver and State of Pennsylvania, this 18th day of November, 1924.

HARRY G. TRAVER.